(12) United States Patent
Saito

(10) Patent No.: US 11,173,429 B2
(45) Date of Patent: Nov. 16, 2021

(54) FILTRATION DEVICE

(71) Applicant: NIHON GENRYO Co., Ltd., Kanagawa (JP)

(72) Inventor: Yasuhiro Saito, Kanagawa (JP)

(73) Assignee: NIHON GENRYO Co., Ltd., Kanagawa (JP)

( * ) Notice: Subject to any disclaimer, the term of this patent is extended or adjusted under 35 U.S.C. 154(b) by 0 days.

(21) Appl. No.: 17/054,688

(22) PCT Filed: May 13, 2019

(86) PCT No.: PCT/JP2019/018882
§ 371 (c)(1),
(2) Date: Nov. 11, 2020

(87) PCT Pub. No.: WO2019/221048
PCT Pub. Date: Nov. 21, 2019

(65) Prior Publication Data
US 2021/0069617 A1    Mar. 11, 2021

(30) Foreign Application Priority Data

May 14, 2018    (JP) .............................. JP2018-093047

(51) Int. Cl.
*B01D 24/46* (2006.01)
*B01D 24/10* (2006.01)
(Continued)

(52) U.S. Cl.
CPC ....... *B01D 24/4673* (2013.01); *B01D 24/105* (2013.01); *B01D 24/12* (2013.01); *B01D 24/4684* (2013.01); *B01D 29/68* (2013.01)

(58) Field of Classification Search
CPC .. B01D 24/4673; B01D 24/105; B01D 24/12; B01D 24/4684; B01D 29/68;
(Continued)

(56) References Cited

U.S. PATENT DOCUMENTS

2003/0010699 A1    1/2003  Saito
2004/0262211 A1    12/2004 Saito
(Continued)

FOREIGN PATENT DOCUMENTS

JP    2004-121885 A    4/2004
JP    2004-160432 A    6/2004
(Continued)

OTHER PUBLICATIONS

International Search Report issued in PCT/JP2019/018882 dated Jul. 16, 2019 (5 pages).
(Continued)

Primary Examiner — Matthew O Savage
(74) Attorney, Agent, or Firm — Osha Bergman Watanabe & Burton

(57) ABSTRACT

A filtration apparatus includes a filtration tank; a layer of filtration media that filters supplied raw water by passing the raw water therethrough within the interior of the filtration tank; and a screw cleansing mechanism having a cylindrical outer cylinder which is provided within the filtration tank in a vertical orientation, a spiral shaped screw which is provided such that the long axis thereof extends in the longitudinal direction of the outer cylinder, and a screw driving member for rotating the screw, that scrubs and cleans filtration media by rotating the screw. The screw is in the shape of a coil spring.

3 Claims, 3 Drawing Sheets

(51) Int. Cl.
  *B01D 24/12* (2006.01)
  *B01D 29/68* (2006.01)
(58) Field of Classification Search
  CPC ........ B01D 24/46; B01D 24/00; B01D 29/66;
       B01D 29/828; B01D 29/705; B01D
       24/10; B01D 2024/125; B01D 24/4631
  See application file for complete search history.

(56) References Cited

U.S. PATENT DOCUMENTS

2005/0252843 A1  11/2005  Saito
2007/0125694 A1   6/2007  Saito

FOREIGN PATENT DOCUMENTS

| JP | 2005-131443 A | 5/2005 | |
|---|---|---|---|
| JP | 2011-245483 A | 12/2011 | |
| WO | 01/83076 A1 | 11/2001 | |
| WO | WO-2015052983 A1 * | 4/2015 | ............. B30B 9/121 |

OTHER PUBLICATIONS

Written Opinion of the International Searching Authority issued in PCT/JP2019/018882 dated Jul. 16, 2019 (4 pages).

* cited by examiner

FILTRATION DEVICE

CROSS-REFERENCE TO RELATED APPLICATIONS

This application is a National Phase Entry of PCT International Application No. PCT/JP2019/018882 filed on May 13, 2019, which claims priority under 35 U.S.C. § 119(a) to Japanese Patent Application No. 2018-093047 filed on May 14, 2018. Each of the above applications is hereby expressly incorporated by reference, in its entirety, into the present application.

TECHNICAL FIELD

The present disclosure is related to a filtration apparatus, more specifically, a filtration apparatus which has a filtration media layer within a filtration tank that filters supplied raw water through the filtration media layer, and particularly to a filtration apparatus that cleans filtration media with a screw provided within the filtration tank.

BACKGROUND ART

Conventionally, filtration apparatuses that have a filtration media layer within a filtration tank that filter supplied raw water through the filtration media layer are known, as disclosed in Japanese Unexamined Patent Publication No. 2004-121885 and Japanese Unexamined Patent Publication No. 2005-131443, for example. Further, a cleansing mechanism that employs a spiral screw as a mechanism for cleansing the filtration media in this type of filtration apparatus is also known, as disclosed in Japanese Unexamined Patent Publication No. 2004-121885 and Japanese Unexamined Patent Publication No. 2005-131443.

The aforementioned cleansing mechanism that employs the screw is basically a mechanism which has a cylindrical outer cylinder arranged vertically in the filtration tank, a spiral screw provided along a drive shaft arranged in the outer cylinder, the screw, and a screw driving means for rotating the screw. The filtration media within the filtration tank is scrubbed and cleansed while being transferred upward by the screw.

By cleansing the filter medium employing the screw cleansing mechanism described above, it is possible to eliminate a decrease in filtration efficiency due to clogging of the filtration media layer and contamination of the filtration media by adhered foreign matter and agglomerates.

SUMMARY

Technical Problem

As described above, the filtration apparatus equipped with the screw cleansing mechanism can obtain a high filtration material cleansing effect, but there is still room for improvement in terms of filtration efficiency, filtration media cleansing efficiency, and weight reduction.

The present disclosure has been developed in view of the foregoing circumstances. The present disclosure provides a filtration apparatus provided with a screw cleansing mechanism that improves filtration efficiency, improves filtration media cleansing efficiency in, and realizes weight reduction.

A filtration apparatus according to the present disclosure comprises a filtration tank;

a layer of filtration media that filters supplied raw water by passing the raw water therethrough within the interior of the filtration tank; and a screw cleansing mechanism having a cylindrical outer cylinder which is provided within the filtration tank in a vertical orientation, a spiral shaped screw which is provided such that the long axis thereof extends in the longitudinal direction of the outer cylinder, and a screw driving means for rotating the screw, that scrubs and cleans filtration media by rotating the screw;

the screw being in the shape of a coil spring.

Here, the expression "being in the shape of a coil spring" means that the shape of the screw as viewed from the direction of the long axis of the screw is a shape in which screw blade members are present in an annular manner around a central aperture at which no member is present. Such a coil spring shape is desirably applied over the entire length of the screw. However, a portion thereof, for example, an end portion in the direction of the long axis of the screw, may not be of such a shape.

Note that in the filtration apparatus of the present disclosure, it is desirable for a drive shaft of the drive means to be coupled to screw blade members that constitute the screw at one end in the direction of the long axis of the screw.

In addition, in the filtration apparatus of the present disclosure, it is desirable for a reinforcing member that extends in direction of the long axis of the screw through practically the entire length of the screw and that couples portions of the screw blade members which are spaced apart to be fixed to the inner peripheral portion of the screw blade members that constitute the screw.

In the case that the drive shaft of the drive means is coupled to the one end of the screw blade member in the direction of the long axis of the screw as described above, it is desirable for the reinforcing member to be coupled to the drive shaft of the drive means either directly or via a coupling member that functions to couple the drive shaft to the one end of the screw blade member.

In the filtration apparatus of the present disclosure, the screw is in the shape of a coil spring. That is, the shape of the screw as viewed from the direction of the long axis of the screw is a shape in which the screw blade members are present in an annular manner around the central aperture at which no member is present. Therefore, filtration media which are present in the portion of the aperture may be effectively utilized for filtration. In this manner, the filtration apparatus of the present disclosure is capable of securing a greater filtration area compared to conventional apparatuses having filtration tanks with the same cross sectional area. As a result, it becomes possible to improve filtration efficiency.

In addition, during cleansing of the filtration media, the filtration media which are present in the central aperture of the screw is stirred and mixed by the vortex generated by the rotation of the screw, and from this point, the filter media cleansing efficiency is improved. Further, also during backwash cleansing, because the aperture is provided at the center of the screw, the flow of backwash water into the outer cylinder is facilitated, the backwash cleansing effect is enhanced, and the filtration media cleansing efficiency is also improved.

Further, the shape of the screw is that which has an aperture in the center in the filtration apparatus of the present disclosure. Therefore, it is possible for the weight of the screw to be reduced. If the weight of the screw is reduced in this manner, a member having a relatively low strength may be applied as a member such as a mirror plate that constitutes the filtration tank. Thereby, a reduction in cost of the filtration apparatus can also be realized.

EMBODIMENTS OF THE DISCLOSURE

Figure 1:
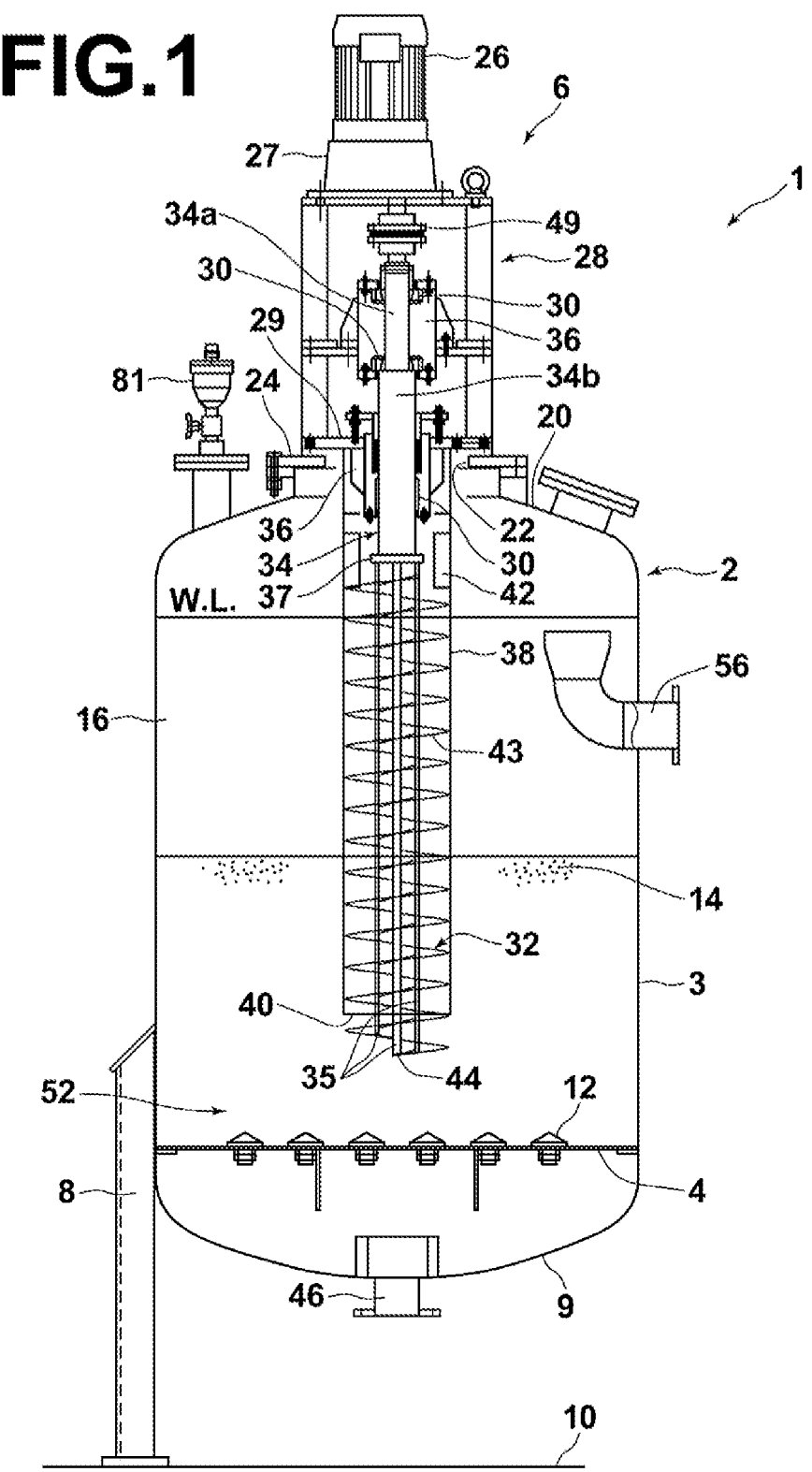
FIG. 1 A cross sectional diagram that illustrates a filtration apparatus according to an embodiment of the present disclosure FIG. 2 A plan view that illustrates a filtration tank of the filtration apparatus of FIG. 1
Figure 2:
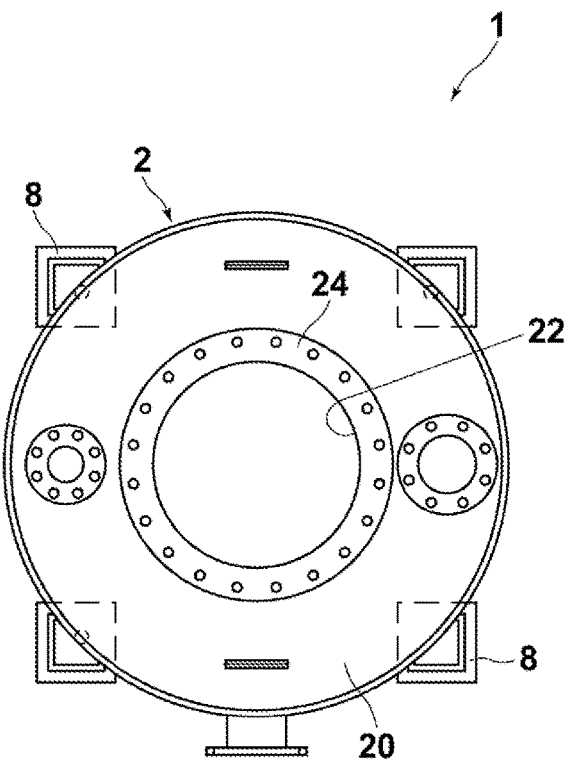

Hereinafter, an embodiment of the filtration apparatus of the present disclosure will be described in detail with reference to the attached drawings. FIG. 1 is a cross sectional diagram that illustrates a filtration apparatus according to the embodiment of the present disclosure. FIG. 2 is a plan view that illustrates a filter bed of the filtration tank of FIG. 1. A description will be given with reference to FIG. 1 and FIG. 2.

The filtration apparatus 1 of the present embodiment has a substantially cylindrical filtration tank 2 with a closed top and a closed bottom, a horizontally oriented filter bed 4 provided within the filtration tank 2 at the lower portion thereof and formed by a steel plate, for example, and a screw cleansing mechanism 6 (hereinafter, also referred to simply as "cleansing mechanism") which is mounted to a curved upper wall 20 of the filtration tank 2. The cleansing mechanism 6 includes a motor 26, a reduction gear mechanism 27, a base 28, a cleansing tank 38 (outer cylinder), and a screw 32 to be described later. Further, the filtration apparatus 1 has a processed water outlet pipe 46 and a raw water injection pipe 56.

Four support legs 8 (only one is illustrated in FIG. 1) are mounted on the filtration tank 2. The support legs 8 install the filtration tank 2 on a floor surface 10. The configuration for supporting the filtration tank 2 is not limited to such support legs 8, and a support structure or the like formed by winding a strip shaped plate material may be employed. The filter bed 4 is provided so as to be separated from a curved bottom wall 9 of the filtration tank 2 in the upward direction. The bottom wall 9 and the aforementioned upper wall 20 are formed by mirror plates, for example. A plurality of strainers 12 are installed on the filter bed 4 to collect processed water (filtered water) and to pass it downward. The details of the filter bed 4 and the strainers 12 will be described later. Further, the aforementioned raw water injection pipe 56 is located at the right side of the filtration tank 2 in FIG. 1, and the outlet of the raw water is of a substantially upwardly oriented L shape. It is possible for the raw water injection pipe 56 to be of other shapes.

A layer of a filtration media 14 for filtering raw water which is injected from the raw water injection pipe 56 is provided on the filter bed 4. The filter bed 4 which is constituted by a steel plate, such as a stainless steel plate, for example, is generally formed to have a thickness within a range from about 5 mm to about 30 mm, in order to support the weight of the filtration media 14, etc. Specifically, the filtration media 14 have a diameter (particle size) within a range from about 0.2 mm to about 4.9 mm. This diameter depends on the quality of the raw water to be treated, but is generally more preferably within a range from about 0.6 to about 1 mm. A plurality of types of filtration media 14 may be stacked. In this case, as an example, sand having a diameter of about 0.6 mm on the lower side, anthracite having a diameter of about 1.2 mm on the upper side, etc. may be employed. The details of the filter bed 4 will be described later. Raw water 16 which flows in from above the filtration media 14 passes through the layer of the filtration media 14, is filtered, passes through the strainer 12, and flows downward from the filter bed 4 as purified processed water.

A circular mounting opening 22 is formed in the central portion of the upper wall 20 of the filtration tank 2. The cleansing mechanism 6 is mounted in the mounting opening 22 by bolts (not shown). The peripheral edge of the mounting opening 22 is formed to be a mounting rim 24. The base 28, on which the motor 26 and the reduction gear mechanism 27 are mounted, is mounted on the rim 24. A holding unit 36 which has a plurality of bearings 30 is formed on the base 28. The bearings 30 support a drive shaft 34 for rotating the screw to be described later in a rotatable manner without shifting.

Next, the cleansing mechanism 6 will be described in detail. The cylindrical cleansing tank 38 (outer cylinder) of the cleansing mechanism 6 has a disk shaped mounting wall 29 at the upper portion thereof. The mounting wall 29 is mounted to the rim 24 together with the base 28 by bolts (not shown). In the drawings, the bolts are substituted by center lines that indicate the positions thereof. When the upper portion of the cleansing tank 38 is mounted to the rim 24 in this manner, substantially the entire cleansing tank 38 is in a state in which it is suspended from the upper portion of the filtration tank 2.

As illustrated in FIG. 1, the lower portion of the cleansing tank 38 is a circular lower opening 40. A plurality of upper openings 42 that extend in the vertical direction are formed at predetermined intervals at the upper portion of the cleansing tank 38 along the outer circumference. The positional relationship between the cleansing tank 38 and the filtration media 14 is determined such that the lower opening 40 is located within the filtration media 14. A screw 32 that constitutes a screw conveyor together with the cleansing tank 38 is provided within the cleansing tank 38. The drive shaft 34 for rotating the screw 32 is constituted by of a reduced diameter portion 34a having a relatively small diameter and a large diameter portion 34b having a large diameter.

The drive shaft 34 is connected to the motor 26 via a joint 49. The large diameter portion 34b for imparting strength to the drive shaft 34 has a portion having a predetermined length and is of a solid rod shape below an upper end portion, and a disk 37 which is fixed to the lower end portion thereof. A spiral screw blade member 43 (hereinafter, simply referred to as "blade member") is coupled to the disk 37. Therefore, when the drive shaft 34 of the motor 26 is rotated, the blade member 43 is rotated. The coupling between the blade member 43 and the disk 37 will be described in detail later.

The blade member 43 is provided such that there is a slight gap between the outer edge thereof and the inner peripheral surface of the cleansing tank 38. The dimension of this gap is desirably about three times the particle size of the filtration media 14. This gap reduces the possibility that the filtration media 14 will be crushed even if the filtration media 14 becomes caught between the blade member 43 and the cleansing tank 38.

Next, components which are attached to the outside of the filtration tank 2 will be described. A processed water outlet pipe 46 that extends downward is attached to the center of the curved bottom wall 9 of the filtration tank 2. The processed water which has passed through the layer of the filter media 14 and then passed through the strainer 12 as described above is discharged out of the filtration tank 2 through the processed water outlet pipe 46. Further, an air vent valve 81 for discharging air from within the filtration tank 2 is attached to the upper portion of the filtration tank 2.

Figure 3:
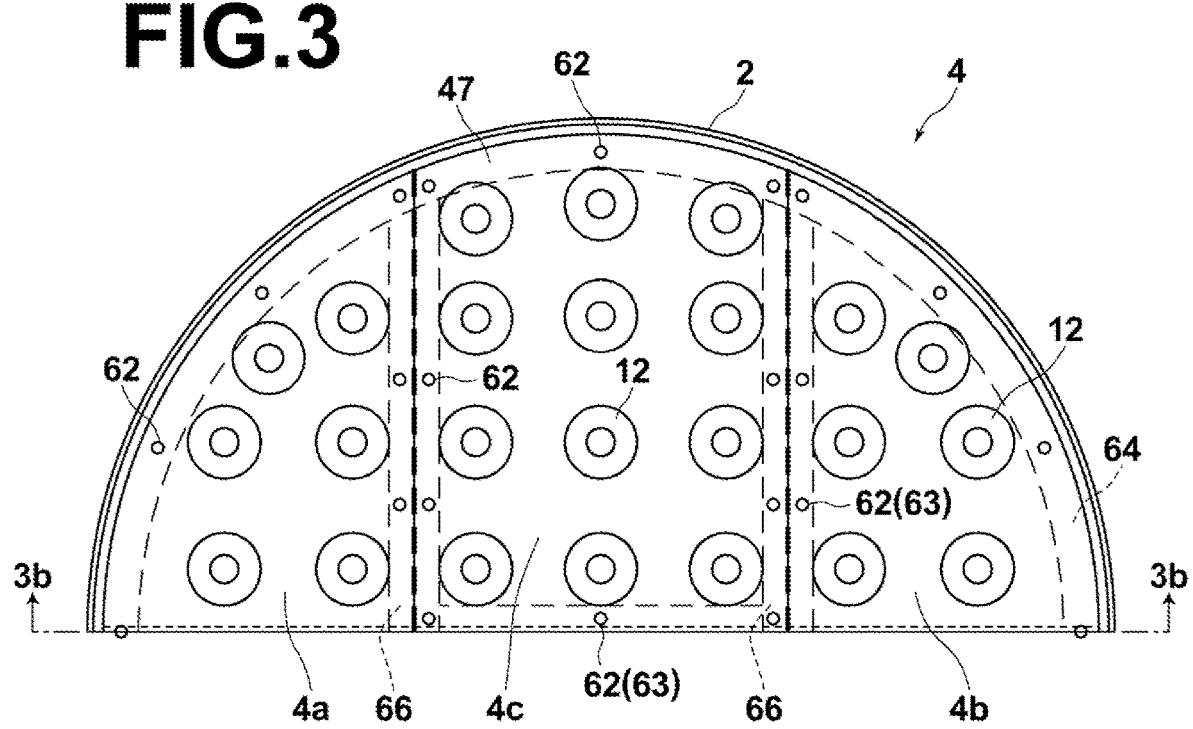
FIG. 3 A plan view that illustrates a filter bed of the filtration apparatus of FIG. 1
Figure 4:
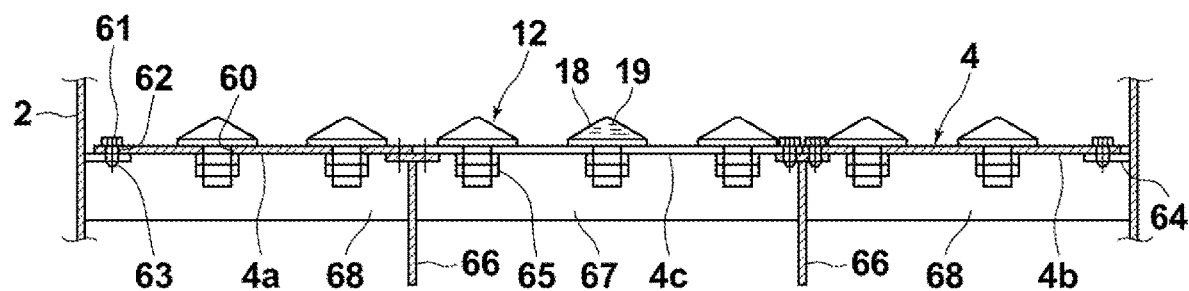
FIG. 4 A cross sectional diagram that illustrates a portion of the filter bed taken along line 3b-3b in FIG. 3

Next, the filter bed 4 will be described with reference to FIG. 3 and FIG. 4. FIG. 3 is a plan view that illustrates half of the filter bed 4. In addition, FIG. 4 is a cross sectional diagram that illustrates a portion of the filter bed taken along line 3b-3b in FIG. 3. The filter bed 4 is constituted by four stainless steel plate shaped portions, for example. In greater detail, the filter bed 4 is constituted by a pair of half moon shaped portions 4a and 4b, and a substantially rectangular portion 4c which is provided between the half moon shaped portions 4a and 4b. One side of the rectangular portion 4c is formed as an arcuate shaped portion 47. Note that in FIG. 3, only halves of the portions 4a, 4b, and 4c are illustrated. That is, the filter bed 4 is of a discoid shape which is linearly symmetrical at both sides of a diameter in FIG. 3. Note that the filter bed 4 need not necessarily be constituted by portions which are divided in the same manner as that of the portions 4a, 4b, and 4c, and may be constituted by portions which are divided in different manners according to the size of the filtration tank 2.

A great number of apertures 60 are formed through the filter bed 4, and the aforementioned strainers 12 are provided within these apertures 60. In addition, a plurality of small apertures 62 for threaded fastening are formed through the outer peripheries of each of the portions 4a, 4b, and 4c. Meanwhile, an annular mounting ring 64 is formed on the inner peripheral surface of the filtration tank 2 along the inner periphery thereof. Screw apertures 63 that correspond to the small apertures 62 are formed in the mounting ring 64. In addition, support beams 66 which have T shaped cross sections are attached to the filtration tank 2 along the mutual joints of the portions 4a, 4b, and 4c. Screw apertures 63 are also formed in the support beam 66. The portions 4a, 4b, and 4c are fastened and fixed to the mounting ring 64 and the support beam 66 by screwing bolts 61 into the small apertures 62 and the screw apertures 63.

In addition, a support beam 67 which has a T shaped cross section is provided substantially at the center of the filtration tank 2 orthogonal to the support beams 66 and coupled to the support beams 66. The support beam 67 has screw apertures 63, and the portion 4c is fastened and fixed to the support beam 67 by screwing a bolt 61 into the screw apertures 63 and the small apertures 62 in the same manner as that described above. Further, as illustrated in FIG. 4, support beams 68 are provided on the left and right sides of the support beam 67. The support beams 68 are provided simply to receive the load of the portions 4a and 4b, and the portions 4a, 4b and 4c are fixed to the support beam 68 by threaded fastening or the like.

Next, the strainers 12 which are provided in the filter floor 4 will be described. The strainers 12 are commercially available "AB strainers" which are pipes with hollow umbrella portions 18 at the leading ends thereof, for example, and are formed by ABS resin or PP (polypropylene). A plurality of concentric narrow slots 19 (liquid passage portions) that the filtration media 14 cannot pass through are formed in the umbrella portions 18, such that only filtered liquid pass through the filter bed 4 in the downward direction.

Note that in FIG. 4, only the slots 19 of the center strainer 12 are illustrated. Male screws are formed on the pipe portions of the strainers 12. Nuts 65 threadedly engage the male screws to mount the strainers 12 to the filter bed 4 by the nuts 65 and the umbrella portions 18. The slots 19 may be of a size that the filtration media 14 cannot pass through, and the width thereof is set to be generally within a range from about 0.1 mm to 2.0 mm. In addition, the strainers 12 are not limited to the aforementioned type having the aforementioned umbrella portion, but may be other conventionally known strainers having pillar shaped portions or semicircular portions.

Next, filtering by the filtration tank 2 will be described, with reference to FIG. 1 again. First, the raw water 16 is injected into the filtration tank 2 through the raw water injection pipe 56. At this time, air within the filtration tank 2 is discharged through the air vent valve 81. In the case of the present embodiment, the water level of the raw water 16 is set so as to reach the upper portion of the filtration tank 2 beyond the raw water injection pipe 56, that is, substantially the entire interior of the filtration tank 2 is filled with the raw water 16. The raw water 16 permeates the filtration media 14 at the exterior of the cleansing tank 38, and also enters the cleansing tank 38 through the upper opening 42. Therefore, the raw water 16 permeates the filtration media 14 in the cleansing tank 38 and is also filtered within the cleansing tank 38.

The water which has permeated through the filtration media 14 and has been filtered (processed water) passes through the filter bed 4 via the strainers 12, is sent out to the exterior through the processed water outlet pipe 46 at the lower portion of the filtration tank 2, and is supplied for utilization. Note that the filter bed 4 and the strainers 12 constitute a water collecting mechanism.

Next, methods for cleansing the filtration media 14 in order to resolve clogging within the layer of the filtration media 14 will be described in detail. Note that there are two types of filtration media cleansing methods which are conducted by the present apparatus. The first is that in which the screw 32 is rotated while backwash water is being supplied, and the second is that in which only the backwash water is suppled. Hereinafter, the former will be simply referred to as "cleansing" or "screw cleansing", and the latter will be referred to as "backwash cleansing" or "backwashing".

First, screw cleansing will be described. Prior to the motor 26 for rotating the screw 32 being started, purified water (backwash water) is caused to flow back into the filtration tank 2 from the processed water outlet pipe 46, and purified water is ejected into the filtration medium 14 through the filter bed 4. When the backwash water is sprayed onto the filtration media 14 from below, the filtration media 14 floats in the backwash water (if raw water is remaining, in the backwash water and the raw water). As a result, the load on the motor 26 when the motor is started is reduced. When the motor 26 is driven and the screw 32 rotates, the filtration media 14 is pushed up into the upper cleansing tank 38 by the blade member 43 of the screw 32, particularly the blade member 43 of the portion exposed below the cleansing tank 38.

The backflow of the backwash water described above is continued during the initial stage of rotation of the screw 32. By rotating the screw 32 in the same state as under backflow cleansing in this manner, the load on the motor 26 during screw rotation is reduced, and mixing and movement of the filtration media 14 at the exterior of the cleansing tank 38 and the filtration media 14 within the interior of the cleansing tank 38 are facilitated the centrifugal force of the screw 32. As a result, the entirety of the filtration medium 14 is evenly cleansed. The supply of backwash water is subsequently reduced in the amount which is supplied (that is, the flow rate) or ceased. However, the rotation of the screw 32 is continued to cleanse the filtration media 14.

The particles of the filtration media 14 are conveyed upward by the rotation of the blade member 43 while rubbing against and scrubbing each other, and are discharged from the upper openings 42 to the exterior of the cleansing tank 38. Separation of contaminants from the filtration media 14 is promoted by the impact of the filtration media 14 with the surface of the water. The filtration media 14 which has dropped back into the water is conveyed upwards into the cleansing tank 38 repeatedly, and scrubbed therein. In this manner, contaminants are separated from the filtration media 14 by repetitive cleansing within the cleansing tank 38. As described above and as illustrated in FIG. 1, the lower end of the screw conveyor 32 is positioned in the vicinity of the filter bed 4. Therefore, the filtration media 14 in the vicinity of the filter bed 4 is conveyed upward as well, thereby thoroughly cleansing the entirety of the filtration media 14.

Note that during the filtration medial cleansing process which is conducted by the screw cleansing mechanism 6, supply of the purified water that causes the filtration media 14 to float is repeated a plurality of times while the screw 32 is rotated continuously with the periods during which the amount of supply is reduced and the periods during which the supply is ceased as intervals therebetween.

When the filtration medial cleansing process which is conducted by the screw cleansing mechanism 6 is complete, the purified water is backwashed again from the processed water discharge pipe 46 prior to the rotation of the screw being ceased, to conduct backwash cleansing (backwashing) that imparts a rinsing effect. This backwashing is continued after the screw conveyor 32 ceases to rotate. The backwashed water, which is backwashed from the processed water discharge pipe 46, sprays into the layer of filtration media 14 through the slots 19 of the strainers 12 within the filter bed 4. Contaminants, which are trapped in the strainers 12, are also easily removed through the slots 19 by the backwashed water.

The contaminants, which are separated from the filtration media 14, float and are expelled to the exterior through the raw water injection pipe 56 along with water that contains contaminants. The backwashed water (cleansing water) is also effectively backwashed through the interior of the cleansing tank 38 during the backwash cleansing, by passing through the aforementioned gap of the blade member 43. Therefore, contaminants within the cleansing tank 38 are also expelled as well.

Figure 5:
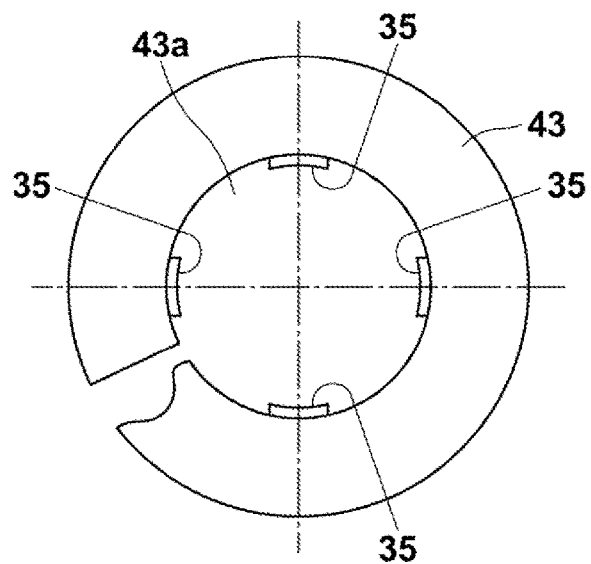
FIG. 5 A partial plan diagram that illustrates a screw of the filtration apparatus of FIG. 1

Next, the coupling between the disk 37 and the blade member 43 illustrated in FIG. 1 will be described in detail. The spiral blade member 43 is formed by a metal such as stainless steel, for example. The blade member 43 is of a shape as illustrated in FIG. 5 when viewed in the direction of the long axis of the screw 32. That is, the blade member 43 is present in an annular manner about the periphery of a central aperture 43a, at which no member is present. Thereby, the screw 32 is in the shape of a coil spring across substantially the entire length thereof.

In addition, four long reinforcing members 35 that extend in the direction of the long axis of the blade member 43, for example, are fixed to the inner peripheral portion of the annular blade member 43 across substantially the entire length thereof. These reinforcing members 35 are also formed by a metal such as stainless steel, for example. In greater detail, each of the reinforcing members 35 is in the shape of an elongated plate, which is cut out from a cylindrical member along the long axis thereof. These reinforcing members 35 are fixed to the inner peripheral edge (on the inner peripheral surface in the present example) of the annular blade member 43 by welding or the like, and couple the portions of the blade member 43 which are separated from each other by welding or the like.

One end of each of the four reinforcing members 35 is fixed to one of the surfaces (the lower surface) of the disk 37 by welding or the like. In addition, the blade member 43 is also fixed to the disk 37, by one end surface (the upper end surface) of the screw 32 being welded to one of the surfaces of the disk 37. In the configuration described above, the motor 26 rotates the drive shaft 34 and rotates the disk 37, thereby rotating the blade member 43. The cleansing of the filtration media 14 by the cleansing mechanism 6 as described above is conducted by rotating the blade member 43 in this manner.

A common screw which is conventionally employed in this type of filtration apparatus is that in which a blade member is mounted about a rotational axis that extends through a central portion. In contrast, the screw 32 of the present embodiment is that which is in the shape of a coil spring, as described above. It is difficult for the screw 32 having the shape of the coil spring in this manner to secure a sufficient strength in the case that it is basically constituted only by the blade member 43. However, the screw 32 according to the present embodiment is reinforced by the four reinforcing members 35 described above, and is that which is equipped with a sufficient amount of strength.

As described above, in the filtration apparatus 1 of the present embodiment, the circular aperture 43a is present at the center of the screw 32. Therefore, the filtration media 14 which are present within the portion of the circular aperture 43a are also effectively utilized for filtration. In this manner, the filtration apparatus of the present disclosure is capable of securing a greater filtration area compared to conventional apparatuses having filtration tanks with the same cross sectional area. As a result, it becomes possible to improve filtration efficiency.

In addition, during cleansing of the filtration media 14, the filtration media 14 which are present in the central circular aperture 43a of the screw 32 is stirred and mixed by the vortex generated by the rotation of the screw 32, and from this point, the filter media cleansing efficiency is improved. Further, also during backwash cleansing, because the circular aperture 43a is provided at the center of the screw 32, the flow of backwash water into the cleansing tank 38 is facilitated, the backwash cleansing effect is enhanced, and the filtration media cleansing efficiency is also improved.

Further, in the filtration apparatus 1 of the embodiment, the shape of the screw 32 is that which has the circular aperture 43a in the center thereof. Therefore, it is possible for the weight of the screw 32 to be reduced. If the weight of the screw 32 is reduced in this manner, a member having a relatively low strength may be applied as a member such as a mirror plate that constitutes the bottom wall 9 and the upper wall 20. Thereby, a reduction in cost of the filtration apparatus 1 can also be realized.

EXPLANATION OF THE REFERENCE NUMERALS 1 filtration apparatus
2 filtration tank 4 filter bed
6 screw cleansing mechanism
12 strainer
14 filtration media
16 raw water
26 motor
32 screw
34 drive shaft
35 reinforcing member
37 disk
38 cleansing tank (outer cylinder)
43 screw blade member

The invention claimed is:

1. A filtration apparatus comprising:
   a filtration tank;
   a horizontally oriented layer of particulate filtration media that filters supplied raw water by passing the raw water therethrough within the interior of the filtration tank; and
   a screw cleansing mechanism having a cylindrical outer cylinder which is provided within the filtration tank in a vertical orientation, a spiral shaped screw located within the cylindrical outer cylinder such that a longitudinal axis of the screw is coaxial with a longitudinal axis of the outer cylinder, and a screw driving means for rotating the screw, that scrubs and cleans filtration media by rotating the screw;
   the screw being in the shape of a coil spring;
   wherein the screw defines a cylindrically shaped open interior area that extends along said longitudinal axis from an open circular aperture at a lower end of the screw to a closed upper end of the screw, and wherein a vertical side of the screw defines a helically shaped open area that fluidly connects an exterior area surrounding the screw to the open interior area of the screw, wherein the horizontally oriented layer of particulate filtration material occupies the open interior area and helically shaped open area of said screw.

2. The filtration apparatus of claim 1, wherein:
   a drive shaft of the screw driving means is coupled to a screw blade member having the shape of a coil spring.

3. The filtration apparatus of claim 2, wherein:
   a reinforcing member that extends in direction of the longitudinal axis of the screw through an entire length of the screw and that couples vertically spaced apart portions of the screw blade member together, and is fixed to an inner peripheral portion of the screw blade member at said vertically spaced apart portions.

* * * * *